US012688313B2

(12) United States Patent
Baruah et al.

(10) Patent No.: US 12,688,313 B2
(45) Date of Patent: Jul. 21, 2026

(54) ENFORCING TRUSTED AND UNTRUSTED POSTURES ON DATA TRAFFIC AND TRANSPORTS

(71) Applicant: Cisco Technology, Inc., San Jose, CA (US)

(72) Inventors: Pritam Baruah, Fremont, CA (US); Amjad Inamdar, Bangalore (IN); Avinash Shah, Pleasanton, CA (US); Sagar Soni, Ottawa (CA); Hari Krishna Donti, Dublin (CA)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 18/753,082

(22) Filed: Jun. 25, 2024

(65) Prior Publication Data
US 2025/0322084 A1 Oct. 16, 2025

(30) Foreign Application Priority Data
Apr. 10, 2024 (IN) .............................. 202441029288

(51) Int. Cl.
G06F 21/60 (2013.01)

(52) U.S. Cl.
CPC .................................. G06F 21/606 (2013.01)

(58) Field of Classification Search
CPC ... G06F 21/606; H04L 43/0894; H04L 43/16; H04L 43/10; H04L 43/20
See application file for complete search history.

(56) References Cited

U.S. PATENT DOCUMENTS 6,829,709 B1 * 12/2004 Acharya ............... H04L 63/164
714/712
7,313,090 B2 * 12/2007 Rojas ...................... H04L 47/39
370/235

(Continued)

FOREIGN PATENT DOCUMENTS

EP        2827276 A1      1/2015

OTHER PUBLICATIONS

C. DeCusatis, P. Liengtiraphan, A. Sager and M. Pinelli, "Implementing Zero Trust Cloud Networks with Transport Access Control and First Packet Authentication," 2016 IEEE International Conference on Smart Cloud (SmartCloud), New York, NY, USA, 2016, (Year: 2016).*

*Primary Examiner* — Theodore C Parsons
*Assistant Examiner* — Sameera Wickramasuriya
(74) *Attorney, Agent, or Firm* — Polsinelli P.C.

(57) ABSTRACT
Disclosed are methods, controllers, and computer-readable media that explicitly label data packets and interfaces as trusted or untrusted. The data packet labeling can occur at a centralized security hub or at the enforcement site itself, i.e., at the interface to the trusted or untrusted region. The packet can be labeled with metadata associated with the packet, and that label can be carried through the transport of the packet to avoid overbroad or unnecessary security procedures. Further, a network administrator can designate certain links as trusted or untrusted so that packets designated as trusted can be sent down trusted links, and untrusted traffic can be sent down untrusted links. Network resources are saved while traffic is better separated and allocated down links with trustworthiness that is congruent with that of the packet.

20 Claims, 5 Drawing Sheets

DESIGNATE, BY A SOFTWARE-DEFINED WIDE AREA NETWORK (SDWAN) CONTROLLER, A FIRST INTERFACE AS A TRUSTED INTERFACE AND A SECOND INTERFACE AS AN UNTRUSTED INTERFACE 402

RECEIVE, WITHIN A NETWORK CONTROLLED BY THE SDWAN CONTROLLER, A DATA PACKET 404

DETERMINE WHETHER THE DATA PACKET IS TRUSTED OR UNTRUSTED 406

LABEL THE DATA PACKET AS TRUSTED OR UNTRUSTED BASED ON THE DETERMINING 408

ROUT THE DATA PACKET TO THE TRUSTED INTERFACE IF THE DATA PACKET IS LABELED AS TRUSTED, AND ROUTING THE DATA PACKET TO THE UNTRUSTED INTERFACE IF THE DATA PACKET IS LABELED AS UNTRUSTED 410

CONDUCT, AT THE TRUSTED INTERFACE OR THE UNTRUSTED INTERFACE, SECURITY PROCESSING ON THE DATA PACKET BASED ON WHETHER THE DATA PACKET IS LABELED AS TRUSTED OR UNTRUSTED 412

(56)  References Cited

U.S. PATENT DOCUMENTS

| 8,310,927 B1 * | 11/2012 | Cohen ................... H04L 12/413 |
| | | 370/338 |
| 10,645,123 B1 * | 5/2020 | Vishwanathan ........ H04L 63/10 |
| 2003/0212904 A1 * | 11/2003 | Randle ................... G06Q 20/04 |
| | | 705/64 |
| 2006/0285493 A1 * | 12/2006 | Manuja ................. H04L 47/125 |
| | | 370/235 |
| 2007/0280222 A1 * | 12/2007 | Smith ..................... H04L 45/22 |
| | | 370/360 |
| 2013/0097318 A1 | 4/2013 | Gladstone et al. |
| 2013/0254871 A1 * | 9/2013 | Sun ..................... H04L 63/0209 |
| | | 726/11 |
| 2015/0106526 A1 * | 4/2015 | Arndt ..................... H04L 41/40 |
| | | 709/227 |
| 2016/0021058 A1 | 1/2016 | Chen et al. |
| 2016/0164910 A1 * | 6/2016 | Tang ....................... H04L 43/16 |
| | | 726/14 |
| 2018/0041470 A1 * | 2/2018 | Schultz ................... H04L 47/24 |
| 2018/0337849 A1 * | 11/2018 | Sharma ................. H04L 41/342 |
| 2020/0007388 A1 * | 1/2020 | Johnston ................. H04L 47/31 |
| 2021/0234860 A1 * | 7/2021 | Bansal .................... H04L 67/51 |
| 2021/0328977 A1 * | 10/2021 | Luo ....................... H04L 63/126 |
| 2022/0200971 A1 * | 6/2022 | Vigneswaran ........ H04L 63/061 |
| 2024/0012921 A1 | 1/2024 | Yannuzzi et al. |

* cited by examiner

400

DESIGNATE, BY A SOFTWARE-DEFINED WIDE AREA NETWORK (SDWAN) CONTROLLER, A FIRST INTERFACE AS A TRUSTED INTERFACE AND A SECOND INTERFACE AS AN UNTRUSTED INTERFACE 402

RECEIVE, WITHIN A NETWORK CONTROLLED BY THE SDWAN CONTROLLER, A DATA PACKET 404

DETERMINE WHETHER THE DATA PACKET IS TRUSTED OR UNTRUSTED 406

LABEL THE DATA PACKET AS TRUSTED OR UNTRUSTED BASED ON THE DETERMINING 408

ROUT THE DATA PACKET TO THE TRUSTED INTERFACE IF THE DATA PACKET IS LABELED AS TRUSTED, AND ROUTING THE DATA PACKET TO THE UNTRUSTED INTERFACE IF THE DATA PACKET IS LABELED AS UNTRUSTED 410

CONDUCT, AT THE TRUSTED INTERFACE OR THE UNTRUSTED INTERFACE, SECURITY PROCESSING ON THE DATA PACKET BASED ON WHETHER THE DATA PACKET IS LABELED AS TRUSTED OR UNTRUSTED 412

FIG. 4

ENFORCING TRUSTED AND UNTRUSTED POSTURES ON DATA TRAFFIC AND TRANSPORTS

CROSS-REFERENCE TO RELATED APPLICATIONS

This application claims priority to Indian Provisional Patent Application No. 202441029288, filed Apr. 10, 2024 and entitled, "ENFORCING TRUSTED AND UNTRUSTED POSTURES ON DATA TRAFFIC AND TRANSPORTS", the contents of which are hereby incorporated by reference in their entirety.

BACKGROUND

Many software-defined wide area network (SDWAN) configurations include trusted and untrusted elements. Security enforcement is typically based on where a packet came from, where it is going, or what the packet is. These attributes can be lost through packet processing and may therefore not be readily apparent when determining trustworthiness. The network interfaces are also typically not labeled as trusted or untrusted, often leading to trusted packets being transmitted down untrusted interfaces, and vice versa.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates a routine according to at least some embodiments of the present technology.

DETAILED DESCRIPTION

Figure 1:
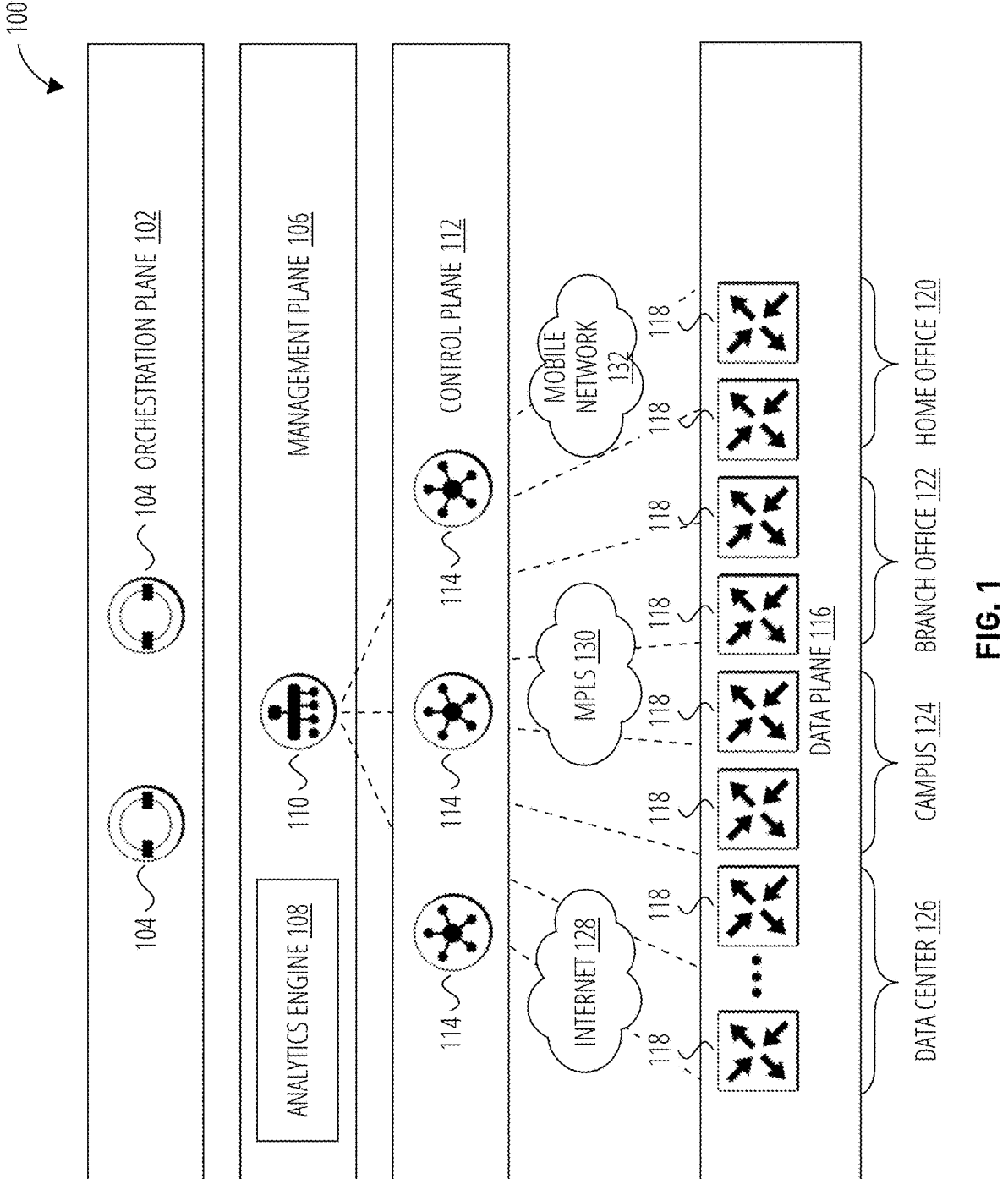
FIG. 1 illustrates an example of a high-level network architecture in accordance with some embodiments of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In 2013, the Transportation Security Administration (TSA) implemented a new procedure it called "PreCheck." TSA PreCheck would allow certain passengers to conduct a security screening in advance of flying. This screening would gather information about the applicant and determine whether they were eligible for a more lenient and expedited security process once they arrived at an airport. In doing so, trustworthy passengers enjoyed shorter and less intrusive security lines. TSA also benefitted from improved efficiency while not materially reducing the safety of its passengers.

Network security is hampered by many of the same issues as the TSA. Packets are often subjected to security enforcement that is overbroad or duplicative of past enforcement. Networks often have multiple regions including trusted and untrusted regions. Once the traffic arrives into the trusted region or within a security hub, the data packet will undergo extensive security processing through firewalls, intrusion prevention systems (IPS), and other services. This security implementation can be resource intensive and inefficient. For example, a packet that is trusted may be required to undergo the same determination of trustworthiness throughout the path of the packet. Similarly, an untrusted packet may be transmitted to a trusted region and fail security requirements. This unnecessary security processing could be avoided simply by knowing whether the packet is trusted or not.

There is currently no method of explicitly labeling a packet as trusted or untrusted, nor is there a method for explicitly marking a network interface as trusted or untrusted. Conventional methods typically rely on the source address, destination address, or other information to determine the trustworthiness of the traffic. But these attributes may lead to complex routing and loss of context, requiring duplicative inspection of the packet to determine whether these attributes qualify the packet as being trusted or untrusted. For example, network address translation (NAT) may modify the source or destination IP addresses to remove the context of the source IP address. There is currently no method of explicitly marking a packet as trusted or untrusted and carrying that posture along with the packet within an administrative domain. Put differently, data packets are unable to fly TSA PreCheck.

Additionally, most network administrators would prefer trusted traffic to be sent across trusted links to avoid duplicative or unnecessary security processing. But there is currently no method of explicitly marking interfaces as trusted or untrusted. This leads to trusted and untrusted traffic being co-mingled together within links that are incongruent with the trust level of the traffic. Put simply, data packets cannot clear security through a TSA PreCheck line—traffic is instead sent across the same general security line.

The presently disclosed technology explicitly labels data packets and interfaces as trusted or untrusted. The data packet labeling can occur at a centralized security hub or at the enforcement site itself, i.e., at the interface to the trusted or untrusted region. The packet can be labeled with metadata associated with the packet, and that label can be carried through the transport of the packet to avoid overbroad or unnecessary security procedures. Further, a network administrator can designate certain links as trusted or untrusted so that packets designated as trusted can be sent across trusted links, and untrusted traffic can be sent across untrusted links. Network resources are saved while traffic is better separated and allocated across links with trustworthiness that is congruent with that of the packet.

Example Embodiments

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include an analytics engine 108 and one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 5G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
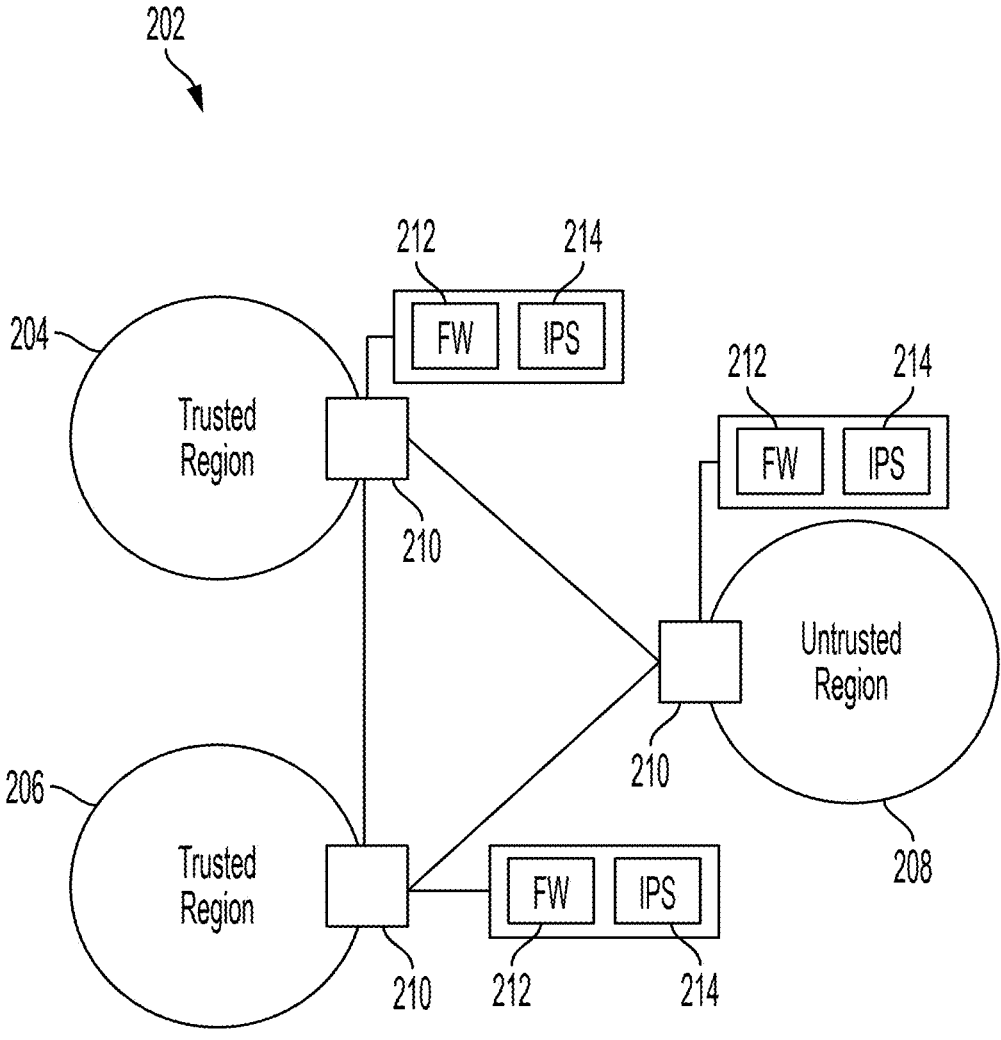
FIG. 2 illustrates a schematic diagram of a network featuring trusted and untrusted regions, according to at least some embodiments of the present technology.

FIG. 2 illustrates a schematic diagram of a network featuring trusted and untrusted regions, according to at least some embodiments of the present technology. As shown, the network 202 includes a first trusted region 204 and a second trusted region 206 communicably coupled to an untrusted region 208. For example, the first trusted region 204, second trusted region 206, and untrusted region 208 can be sites or regions within a network of a business or private customer of network services. The first trusted region 204 and the second trusted region 206 can each include an interface 210 that receives network traffic and that is capable of performing security processing on the packet through one or more service chains. For example, the first trusted region 204 can implement a service chain with a firewall 212 and an intrusion prevention system 214.

Consider the following example: a network administrator has previously configured the network to explicitly identify the first trusted region 204 and second trusted region 206 as trusted regions, and the untrusted region 208 as an untrusted region. Thereafter, a data packet is transmitted into the first trusted region 204 from either the untrusted region 208 or from outside the network 202. For example, the data packet may be transmitted from a wide area network (WAN) to a local area network (LAN) associated with the network 202.

The packet may reach the first trusted region 204 with metadata such as the source IP address, destination IP address, application, source device, destination device, port numbers, protocol type, and security attributes such as encryption status and authentication tokens. Each of these fields, and other fields or attributes of the data packet, may be used to determine whether the packet is trustworthy. For example, the network administrator may custom configure the network 202 to consider various fields of the data packet that the administrator believes is an indicator of trustworthiness. The configuration may be static, where the network administrator identifies relevant fields for determining trustworthiness, or dynamic, where these fields change over time to better address trustworthiness.

In some embodiments, the trustworthiness of the packet is determined at the interface 210 of the region in which the data packet is entering (here, the interface 210 of the first trusted region 204) based on the administrator-defined criteria. This could be referred to as a "local policy." As discussed below with respect to FIG. 3, the trustworthiness can also be determined by a security hub connected to other network components. This could be referred to as a "remote policy." The interface 210 may then label the packet as a trusted packet or untrusted packet based on the administrator-defined fields in the packet. For example, the firewall 212 may label the packet as trusted or untrusted. Any other manner of labeling the packet as trusted or untrusted may be implemented without departing from the spirit and scope of the present technology.

Following packet labeling, enforcement may then take place. For example, the interfaces 210 may retrieve the trusted or untrusted status of the packet by packet inspection or by fetching this attribute from a security sub-block of the network 202. The interface 210 can then route the packet along an interface 210 with a trustworthiness that is congruent with that of the packet or permit entry of the packet if the trusted status of the packet matches that of the interface 210. In one example, consider a packet that enters the first trusted region 204 is labeled as untrusted. Here, the interface 210 may then route the packet to the untrusted region 208 of the network 202 for processing and forwarding. Or, if the first trusted region 204 labels the packet as trusted, the first trusted region 204 can then subject the packet to the security protocol of the first trusted region 204. The security protocol of the first trusted region 204 and the second trusted region 206 (or other trusted regions) may ordinarily be more rigorous than the security protocol of the untrusted region 208. However, after identifying the packet as trusted, the first trusted region 204 and the second trusted region 206 may perform less rigorous security processing on the packet due to the fact that the packet is labeled or otherwise identified as trusted. Consider this analogous to the TSA PreCheck concept discussed above. Similarly, a packet labeled as untrusted may undergo extensive security processing in the untrusted region 208 to ensure the untrusted packet is not a security risk even though it is labeled as untrusted. Consider this analogous to more enhanced security at an airport for an individual who has been identified as a potential threat, e.g., someone with an extensive criminal history or background indicative of a threat.

In providing the above processing, the resources of the network 202 can be conserved and not unnecessarily wasted on packets whose trusted or untrusted status are incongruent with that of the interface 210. The above process also allows for packets to be designated as trusted or untrusted and be subjected to a security processing that is consistent with the threat-level of the packet. Security is maintained while network efficiency is improved.

The interface 210 can be any network interface capable of conducting security inspection of a packet and determination of a trustworthiness level for the packet. For example, the interface 210 can be a high availability (HA) pair, a load balancer, a virtual network interface, or a physical network port. Each type of interface can be configured with security features that analyze incoming and outgoing traffic to identify potentially malicious packets based on predefined security policies. Additionally, the interface 210 may include the firewall 212 or the intrusion prevention system 214 to enhance its ability to evaluate and manage traffic. As described herein, the interface 210 is an HA pair that partially or completely carries out one or more service chains. However, the present technology is not so limited, and can be implemented across any interface.

The firewall 212 can be any firewall capable of carrying out security processing service chains on a packet. For example, the firewall 212 can be a stateful inspection firewall, a next-generation firewall (NGFW), or a web application firewall (WAF). Similarly, the intrusion prevention system 214 can be any intrusion prevention system (IPS) capable of preventing a malicious packet from entering a trusted or untrusted network. For example, the intrusion prevention system 214 may be a network-based IPS (NIPS), a host-based IPS (HIPS), a wireless IPS (WIPS), or part of a unified threat management (UTM) system.

Figure 3:
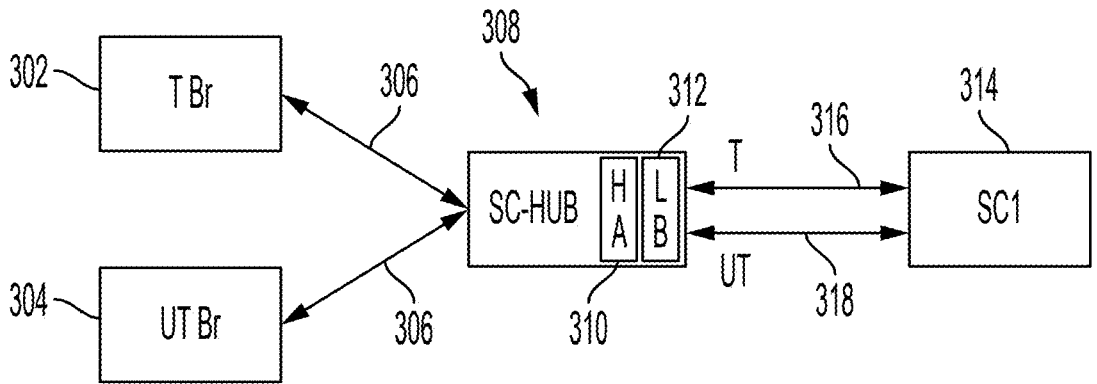
FIG. 3 illustrates a schematic diagram demonstrating the flow of packets, according to at least some embodiments of the present technology.

FIG. 3 illustrates a schematic diagram demonstrating the flow of packets according to at least some embodiments of the present technology. As shown, a trusted branch 302 and an untrusted branch 304 can communicate over SDWAN tunnels 306 with a service chain hub 308. The service chain hub 308 can include a high availability (HA) pair 310 and a load balancer 312. The service chain hub 308 can transmit data to be processed by a service chain 314 across either a trusted link 316 or an untrusted link 318.

The embodiment illustrated in FIG. 3 is similar to at least some embodiments of FIG. 2 in that a packet is labeled as trusted or untrusted, and then transported across a link or interface (e.g., a HA pair) that was previously designated as trusted or untrusted based on a policy of the network. For example, the packet, trusted link 316 and untrusted link 318 can be designated as trusted and untrusted based on static or dynamic criteria that are administrator-configurable at the policy level. The embodiment(s) of FIG. 3 can vary by labeling a packet at a centralized location, which in some embodiments is more cost effective. Enforcement can still be performed at the local level through the interfaces labeled as trusted or untrusted, e.g., the HA pairs that act as the interface with the trusted or untrusted regions.

As shown, a packet can be labeled at the trusted branch 302 or untrusted branch 304 as trusted or untrusted, and transmitted across SDWAN tunnels 306 to the service chain hub 308. The trusted branch 302 and untrusted branch 304 can collectively be referred to as a security hub. For example, the security hub can be one or more devices that determines packet trustworthiness and assigns a label, in the form of metadata, that can then be carried with the packet throughout the network and service chain. The security hub can determine trustworthiness in the same manner as the interface 210 of FIG. 2, e.g., by inspection of packet fields and based on administrator-configurable criteria. The service chain hub 308 can then send the packet, via the HA pair 310 and load balanced by the load balancer 312, across either the trusted link 316 or untrusted link 318, based on which interface is congruent with the trustworthiness of the packet. The packet can then be processed by the service chain 314 according to the appropriate security level. For example, a trusted packet may undergo less rigorous security processing than an untrusted packet.

FIG. 4 illustrates a routine according to at least some embodiments of the present technology. In block 402, routine 400 designates, by a software-defined wide area network (SDWAN) controller, a first interface as a trusted interface and a second interface as an untrusted interface. For example, the SDWAN controller can designate a first interface as a trusted interface and a second interface as an untrusted interface based on user-defined criteria selected by a network administrator.

In block 404, routine 400 receives, within a network controlled by the SDWAN controller, a data packet. For example, the first interface, second interface, or security hub may receive the data packet. The packet may then undergo labeling and security processing.

In block 406, routine 400 determines whether the data packet is trusted or untrusted. For example, criteria used in the determining whether the data packet is trusted or untrusted can be provided by the SDWAN controller based on user-selected criteria within a centralized data policy.

In block 408, routine 400 labels the data packet as trusted or untrusted based on the determining step. For example, the first interface, second interface, or security hub may label the packet as trusted or untrusted. This process is typically handled by the first interface, second interface, or the security hub, which in some embodiments are each configured to assess and categorize incoming packets according to the network's security policies. The packet may be labeled as trusted or untrusted by adding or modifying metadata within the data packet. The first interface, second interface, or security hub may also encrypt the data packet after the data packet is labeled as trusted or untrusted. This encryption serves multiple purposes: it protects the integrity and confidentiality of the packet as it travels through the network, and prevents any potential tampering with the label assigned to the packet. Encryption at this stage ensures that a packet labeled as untrusted remains clearly identifiable as such, thwarting any attempts to disguise or modify its trust status.

In block 410, routine 400 routes the data packet to the trusted interface if the data packet is labeled as trusted, and routes the data packet to the untrusted interface if the data packet is labeled as untrusted. For example, the first interface (which is trusted) may route an untrusted data packet to the untrusted interface, and vice versa. The security hub may also route the data packet to the interface with a trustworthiness that is congruent with that of the data packet. In some embodiments, the first interface and second interface are each their own HA pair.

In block 412, routine 400 conducts, at the trusted interface or the untrusted interface, security processing on the data packet based on whether the data packet is labeled as trusted or untrusted. For example, the first interface or second interface can conduct security processing on the data packet based on whether the data packet is labeled as trusted or untrusted. As explained above, a trusted packet may require less security processing than an untrusted packet. Further, while labeling of the packet may be remote (through a security hub) or local (at the interface level), the enforcement can occur at the interface level, in some embodiments.

As used herein, the term "interface" is not intended to be limited to a physical interface or an HA pair. Rather, interface can mean a service chain for security purposes, or any other physical or virtual connection point to a trusted or untrusted region of a network.

Figure 5:
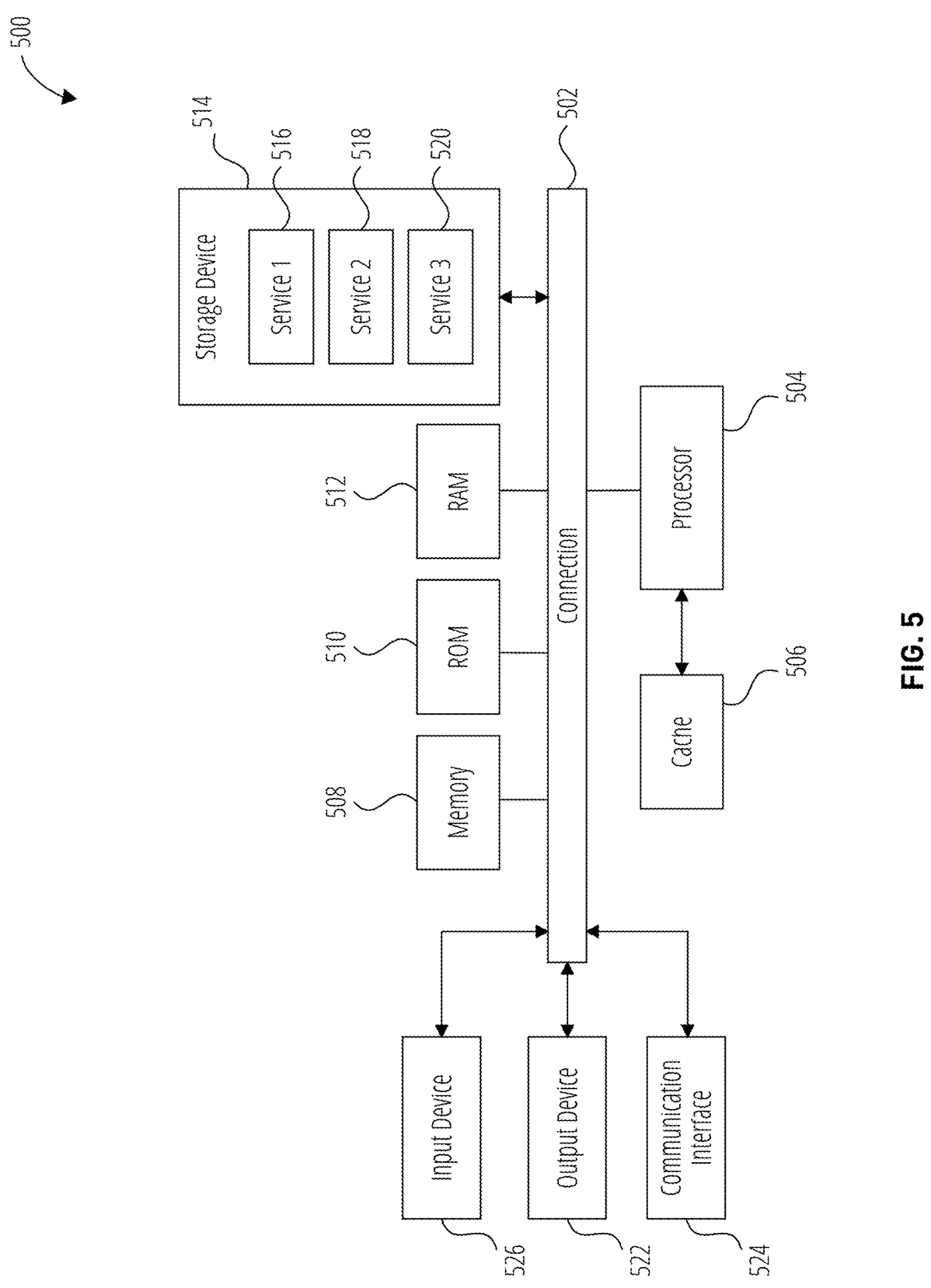
FIG. 5 shows an example of a system for implementing certain aspects according to at least some embodiments of the present technology.

FIG. 5 shows an example of computing system 500, which can be for example any computing device making up an SDWAN controller, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising designating, by a software-defined wide area network (SDWAN) controller, a first interface as a trusted interface and a second interface as an untrusted interface; receiving, within a network controlled by the SDWAN controller, a data packet; determining whether the data packet is trusted or untrusted; labeling the data packet as trusted or untrusted based on the determining; routing the data packet to the trusted interface if the data packet is labeled as trusted, and routing the data packet to the untrusted interface if the data packet is labeled as untrusted; and conducting, at the trusted interface or the untrusted interface, security processing on the data packet based on whether the data packet is labeled as trusted or untrusted.

Aspect 2. The method of Aspect 1, wherein the labeling the data packet as trusted or untrusted is performed by a security hub.

Aspect 3. The method of Aspects 1 or 2, wherein the labeling the data packet as trusted or untrusted is performed by the first interface or the second interface.

Aspect 4. The method of any of Aspects 1-3, wherein the labeling the data packet as trusted or untrusted is performed by adding or modifying metadata within the data packet.

Aspect 5. The method of any of Aspects 1-4, further comprising encrypting the data packet after the data packet is labeled as trusted or untrusted.

Aspect 6. The method of any of Aspects 1-5, wherein criteria used in the determining whether the data packet is trusted or untrusted are provided by the SDWAN controller based on user-selected criteria within a centralized data policy.

Aspect 7. The method of any of Aspects 1-6, wherein the first interface and the second interface are each high availability pairs.

Aspect 8. A software-defined wide area network (SDWAN) controller comprising a storage configured to store instructions; and at least one processor configured to execute the instructions and cause the at least one processor to: designate a first interface as a trusted interface and a second interface as an untrusted interface; receive, within a network controlled by the SDWAN controller, a data packet; determine whether the data packet is trusted or untrusted; label the data packet as trusted or untrusted based on the instructions to determine; route the data packet to the trusted interface if the data packet is labeled as trusted, and route the data packet to the untrusted interface if the data packet is labeled as untrusted; and conduct, at the trusted interface or the untrusted interface, security processing on the data packet based on whether the data packet is labeled as trusted or untrusted.

Aspect 9. The SDWAN controller of Aspect 8, wherein the instructions to label the data packet as trusted or untrusted is performed by a security hub.

Aspect 10. The SDWAN controller of Aspects 8 or 9, wherein the instructions to label the data packet as trusted or untrusted is performed by the first interface or the second interface.

Aspect 11. The SDWAN controller of any of Aspects 8-10, wherein the instructions to label the data packet as trusted or untrusted is performed by adding or modifying metadata within the data packet.

Aspect 12. The SDWAN controller of any of Aspects 8-11, wherein the at least one processor is further configured to execute the instructions and cause the at least one processor to encrypt the data packet after the data packet is labeled as trusted or untrusted.

Aspect 13. The SDWAN controller of any of Aspects 8-12, wherein criteria used in the instructions to determine whether the data packet is trusted or untrusted are provided as user-selected criteria within a centralized data policy.

Aspect 14. The SDWAN controller of any of Aspects 8-14, wherein the first interface and the second interface are each high availability pairs.

Aspect 15. A non-transitory computer-readable storage medium including instructions that, when executed by at least one processor, cause the at least one processor to designate, by a software-defined wide area network (SD-WAN) controller, a first interface as a trusted interface and a second interface as an untrusted interface; receive, within a network controlled by the SDWAN controller, a data packet; determine whether the data packet is trusted or untrusted; label the data packet as trusted or untrusted based on the instructions to determine; route the data packet to the trusted interface if the data packet is labeled as trusted, and routing the data packet to the untrusted interface if the data packet is labeled as untrusted; and conduct, at the trusted interface or the untrusted interface, security processing on the data packet based on whether the data packet is labeled as trusted or untrusted.

Aspect 16. The non-transitory computer-readable storage medium of Aspect 15, wherein the instructions to label the data packet as trusted or untrusted is performed by a security hub.

Aspect 17. The non-transitory computer-readable storage medium of Aspects 15 or 16, wherein the instructions to label the data packet as trusted or untrusted is performed by the first interface or the second interface.

Aspect 18. The non-transitory computer-readable storage medium of any of Aspects 15-17, wherein the instructions to label the data packet as trusted or untrusted is performed by adding or modifying metadata within the data packet.

Aspect 19. The non-transitory computer-readable storage medium of any of Aspects 15-18, wherein criteria used in the instructions to determine whether the data packet is trusted or untrusted are provided based on user-selected criteria within a centralized data policy.

Aspect 20. The non-transitory computer-readable storage medium of any of Aspects 15-19, wherein the instructions to determine whether the data packet is trusted or untrusted is conducted by the SDWAN controller based on user-selected criteria within a centralized data policy.

What is claimed is:

1. A method comprising:
   designating, by a software-defined wide area network (SDWAN) controller, a first interface as a trusted interface and a second interface as an untrusted interface;
   receiving, within a network controlled by the SDWAN controller, a data packet;
   determining whether the data packet is trusted or untrusted;
   labeling the data packet as trusted or untrusted based on the determining so as to create a packet label identifying the packet as trusted or untrusted, wherein the packet label comprises metadata associated with the data packet and that is carried with the data packet through transport;
   routing the data packet to the trusted interface if the data packet is labeled as trusted, and routing the data packet to the untrusted interface if the data packet is labeled as untrusted; and
   conducting, at the trusted interface or the untrusted interface, security processing on the data packet by reading the packet label, wherein the trusted interface conducts security processing that is less rigorous than security processing conducted by the untrusted interface by selecting, based on the packet label, a security service chain for the data packet, wherein the security service chain selected for a packet labeled as untrusted includes at least one additional security service relative to the security service chain selected for a packet labeled as trusted.

2. The method of claim 1, wherein the labeling the data packet as trusted or untrusted is performed by a security hub.

3. The method of claim 1, wherein the labeling the data packet as trusted or untrusted is performed by the first interface or the second interface.

4. The method of claim 1, wherein the labeling the data packet as trusted or untrusted is performed by adding or modifying metadata within the data packet.

5. The method of claim 1, further comprising encrypting the data packet after the data packet is labeled as trusted or untrusted.

6. The method of claim 1, wherein criteria used in the determining whether the data packet is trusted or untrusted are provided by the SDWAN controller based on user-selected criteria within a centralized data policy.

7. The method of claim 1, wherein the first interface and the second interface are each high availability pairs.

8. A software-defined wide area network (SDWAN) controller comprising:
   a storage configured to store instructions; and
   at least one processor configured to execute the instructions and cause the at least one processor to:
      designate a first interface as a trusted interface and a second interface as an untrusted interface;
      receive, within a network controlled by the SDWAN controller, a data packet;
      determine whether the data packet is trusted or untrusted;
      label the data packet as trusted or untrusted based on the instructions to determine so as to create a packet label identifying the packet as trusted or untrusted, wherein the packet label comprises metadata associated with the data packet and that is carried with the data packet through transport;
      route the data packet to the trusted interface if the data packet is labeled as trusted, and route the data packet to the untrusted interface if the data packet is labeled as untrusted; and
      conduct, at the trusted interface or the untrusted interface, security processing on the data packet by reading the packet label, wherein the trusted interface conducts security processing that is less rigorous than security processing conducted by the untrusted interface by selecting, based on the packet label, a security service chain for the data packet, wherein the security service chain selected for a packet labeled as untrusted includes at least one additional security service relative to the security service chain selected for a packet labeled as trusted.

9. The SDWAN controller of claim 8, wherein the instructions to label the data packet as trusted or untrusted is performed by a security hub.

10. The SDWAN controller of claim 8, wherein the instructions to label the data packet as trusted or untrusted is performed by the first interface or the second interface.

11. The SDWAN controller of claim 8, wherein the instructions to label the data packet as trusted or untrusted is performed by adding or modifying metadata within the data packet.

12. The SDWAN controller of claim 8, wherein the at least one processor is further configured to execute the instructions and cause the at least one processor to encrypt the data packet after the data packet is labeled as trusted or untrusted.

13. The SDWAN controller of claim 8, wherein criteria used in the instructions to determine whether the data packet is trusted or untrusted are provided based on user-selected criteria within a centralized data policy.

14. The SDWAN controller of claim 8, wherein the first interface and the second interface are each high availability pairs.

15. A non-transitory computer-readable storage medium including instructions that, when executed by at least one processor, cause the at least one processor to:

designate, by a software-defined wide area network (SD-WAN) controller, a first interface as a trusted interface and a second interface as an untrusted interface;

receive, within a network controlled by the SDWAN controller, a data packet;

determine whether the data packet is trusted or untrusted so as to create a packet label identifying the packet as trusted or untrusted;

label the data packet as trusted or untrusted based on the instructions to determine, wherein the packet label comprises metadata associated with the data packet that is carried with the data packet through transport;

route the data packet to the trusted interface if the data packet is labeled as trusted, and routing the data packet to the untrusted interface if the data packet is labeled as untrusted; and conduct, at the trusted interface or the untrusted interface, security processing on the data packet by reading the packet label, wherein the trusted interface conducts security processing that is less rigorous than security processing conducted by the untrusted interface by selecting, based on the packet label, a security service chain for the data packet, wherein the security service chain selected for a packet labeled as untrusted includes at least one additional security service relative to the security service chain selected for a packet labeled as trusted.

16. The non-transitory computer-readable storage medium of claim 15, wherein the instructions to label the data packet as trusted or untrusted is performed by a security hub.

17. The non-transitory computer-readable storage medium of claim 15, wherein the instructions to label the data packet as trusted or untrusted is performed by the first interface or the second interface.

18. The non-transitory computer-readable storage medium of claim 15, wherein the instructions to label the data packet as trusted or untrusted is performed by adding or modifying metadata within the data packet.

19. The non-transitory computer-readable storage medium of claim 15, wherein the instructions to determine whether the data packet is trusted or untrusted is conducted based on user-selected criteria within a centralized data policy.

20. The non-transitory computer-readable storage medium of claim 15, wherein criteria used in the instructions to determine whether the data packet is trusted or untrusted are provided by the SDWAN controller based on user-selected criteria within a centralized data policy.

\* \* \* \* \*